United States Patent
Gebhardt et al.

(10) Patent No.: US 12,436,040 B2
(45) Date of Patent: Oct. 7, 2025

(54) TEMPERATURE-MEASURING DEVICE

(71) Applicant: ABB Schweiz AG, Baden (CH)

(72) Inventors: Joerg Gebhardt, Mainz (DE); Wilhelm Daake, Petershagen (DE); Karsten Schroeder, Petershagen (DE); Subhashish Dasgupta, Bangalore (IN); Guruprasad Sosale, Munich (DE); Patric Ackermann, Fischbachtal (DE)

(73) Assignee: ABB SCHWEIZ AG, Baden (CH)

( * ) Notice: Subject to any disclaimer, the term of this patent is extended or adjusted under 35 U.S.C. 154(b) by 763 days.

(21) Appl. No.: 17/702,166

(22) Filed: Mar. 23, 2022

(65) Prior Publication Data

US 2022/0307915 A1    Sep. 29, 2022

(30) Foreign Application Priority Data

Mar. 23, 2021 (EP) .................................. 21164209

(51) Int. Cl.
*G01K 7/16* (2006.01)
*G01K 1/12* (2006.01)

(52) U.S. Cl.
CPC ............... *G01K 7/16* (2013.01); *G01K 1/12* (2013.01)

(58) Field of Classification Search
None
See application file for complete search history.

(56) References Cited

U.S. PATENT DOCUMENTS

| | | | |
|---|---|---|---|
| 4,618,266 A * | 10/1986 | Feller | G01K 17/06 165/47 |
| 2014/0008350 A1 * | 1/2014 | Becker | H05B 3/50 219/553 |
| 2018/0094990 A1 | 4/2018 | Rud et al. | |

(Continued)

FOREIGN PATENT DOCUMENTS

| | | |
|---|---|---|
| CN | 203433379 U | 2/2014 |
| CN | 203443695 U | 2/2014 |
| DE | 202011001280 U1 | 6/2012 |

(Continued)

OTHER PUBLICATIONS

Gebhardt et al, "Accurate and quickly responsive surface temperature measurement: a step to widespread non-invasive T-measurement in industry," 2019 *IEEE International Instrumentation and Measurement Technology Conference (I2MTC)*, pp. 1-6 (May 20-23, 2019).

Gebhardt et al, "Non-invasive temperature measurement of turbulent flows of aqueous solutions and gases in pipes," *Technisches Messen*, 87(9): 553-563 (Aug. 13, 2020).

(Continued)

*Primary Examiner* — Erica S Lin
(74) *Attorney, Agent, or Firm* — Leydig, Voit & Mayer, Ltd.

(57) ABSTRACT

A temperature-measuring device for determining the temperature of a surface or a medium by utilizing the temperature of the surface enclosing the medium includes at least one measuring sensor and at least one reference sensor as well as a value processing device, which is connected to the measuring sensor via a first connection line and which is connected to the reference sensor via a second connection (Continued)

line, wherein of both connection lines at least the first connection line is partly realized as a mineral-insulated sheathed cable providing the measuring sensor, wherein both connection lines comprise a flexible cable connected to the value processing means.

11 Claims, 3 Drawing Sheets

(56) References Cited

U.S. PATENT DOCUMENTS

2020/0321793 A1\* 10/2020 Al-Ali .................... A61B 5/303

FOREIGN PATENT DOCUMENTS

| JP | 6-34310 A | 2/1994 | |
| WO | WO-2019063519 A1 \* | 4/2019 | ............. G01K 1/024 |
| WO | WO 2020/035260 A1 | 2/2020 | |

OTHER PUBLICATIONS

European Patent Office, Extended European Search Report in European Application No. 21164209.5, 7 pp. (Sep. 13, 2021).
The Patent Office of the People's Republic of China, Office Action in Chinese Patent Application No. 202210283875.1, 8 pp. (Jan. 21, 2025).

\* cited by examiner

TEMPERATURE-MEASURING DEVICE

CROSS-REFERENCE TO RELATED APPLICATIONS

This patent application claims priority to European patent application ser. no. EP21164209.5, which was filed on Mar. 23, 2021, and is incorporated herein in its entirety by reference.

FIELD OF THE DISCLOSURE

The present disclosure relates to a temperature-measuring device for determining the temperature of a surface or a medium by utilizing the temperature of the surface enclosing the medium.

BACKGROUND OF THE INVENTION

Temperature-measuring devices are known in industrial process measurement technology, in which one or more temperature sensors are mounted in a protective tube, which projects at least partially into the interior of the pipeline or a container. For this purpose, an opening with the associated sealing of the temperature-measuring device must be provided in the pipe or container.

These invasive measuring arrangements have the disadvantage that components protrude into the process chamber, resulting in loss of flow energy, abrasion, breakage damage, obstruction of the production process and/or cleaning processes and potential leakage can occur. In addition, explosion protection may need to be considered at each pipe and vessel opening.

The field of application of the disclosure extends to temperature measurement devices in which a surface temperature sensor is placed on a surface in order to measure the temperature of this surface, and also in order to measure the temperature of a medium lying below or behind it.

Ideally, such a sensor should assume the temperature of the medium enclosed by the surface. If the temperature sensor is designed as an electrical thermocouple, for example, the temperature of the sensor and thus the temperature of the medium can be inferred by measuring the thermoelectric voltage, provided that both are in thermal equilibrium, i.e. have the same temperature.

Prior art WO 2019/063519 A1 discloses a non-invasive temperature-measuring device for measurement of a medium temperature through a housing wall surrounding the medium. The temperature-measuring device comprises at least one measuring sensor and at least one reference sensor. Both sensors are connected via the same heat conductive element, arranged between the measuring point and a measurement processing equipment. In order to provide a robust design for the industry use and to withstand very high and/or very low measuring temperatures, both sensors are connected to the measurement processing equipment via a mineral-insulated sheathed cable or rod.

In WO 2020/035260 A1a non-invasive temperature-measuring device is disclosed for measurement of a medium temperature through a housing wall (e.g. a pipe or vessel) surrounding the medium. The measuring device comprising a measurement sensor, arranged close to the measuring point and a reference sensor, which is arranged between the measurement sensor and a coupling element. The coupling element is connected to the mineral-insulated sheathed cables of the measuring sensor and the reference sensor, via which the sensors are connected with a value processing means.

A drawback of many designs is that they are quite inflexible. The signal-processing unit is expected to be positioned head-mounted, at one end of the mineral insulated measurement rod, or rods. This puts limits to measurements of very high or very low temperatures, since the signal processing electronics must not be exposed to temperatures of approx. 85° C. or more. Also very low temperatures can be a problem.

BRIEF SUMMARY OF THE INVENTION

In a general aspect, the present disclosure provides a temperature-measuring device for non-invasive measurement of a medium through a housing wall or the temperature of a surface under reproducible thermal conditions at the measuring point, with which device very high or low temperatures are measurable with high measuring accuracy.

The problem is solved by a temperature-measuring device according to claim 1. Advantageous embodiments of the disclosure are specified in the dependent claims.

According to the disclosure, a temperature-measuring device is proposed for determining the temperature of a surface or a medium by means of the temperature of the surface enclosing the medium. The temperature-measuring device comprises at least one measuring sensor and at least one reference sensor as well as a value processing means, which is connected to the measuring sensor via a first connection line and which is connected to the reference sensor via a second connection line. According to the disclosure, of both connection lines at least the first connection line is partly realized as a mineral-insulated sheathed cable providing the measuring sensor, wherein both connection lines comprise a flexible cable connected to the value processing means.

BRIEF DESCRIPTION OF THE SEVERAL VIEWS OF THE DRAWING(S)

The subject matter of the disclosure will be explained in more details in the following description illustrated in the drawings FIG. 1 is a schematic drawing of the temperature-measuring device according to a first embodiment of the present disclosure.

DETAILED DESCRIPTION OF THE INVENTION

Figure 1:
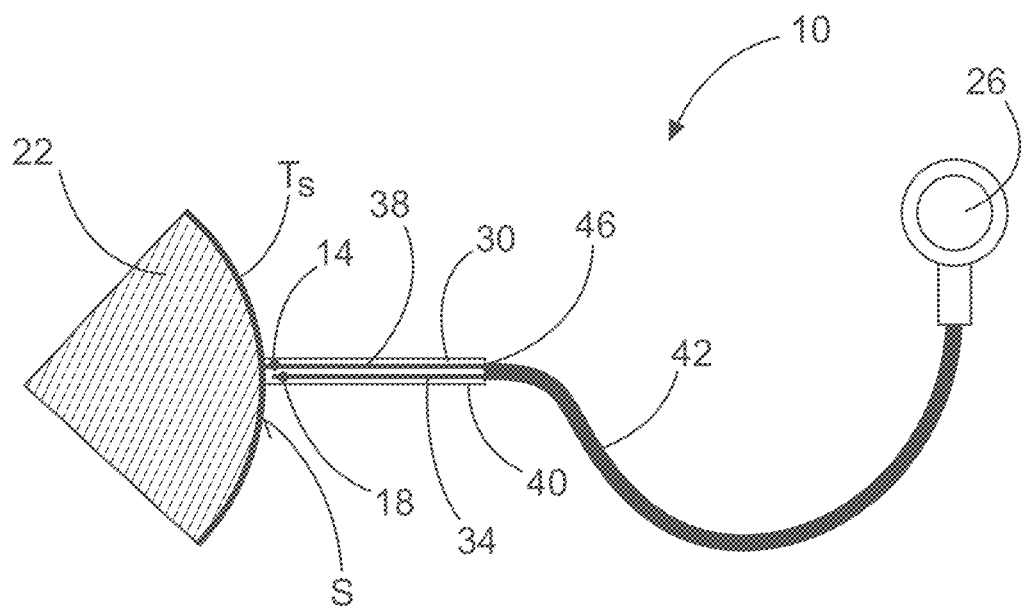

FIG. 1 shows a schematic drawing of the temperature-measuring device 10 according to a first embodiment of the present disclosure. The temperature-measuring device 10 comprises a measuring sensor 14 and a reference sensor 18. In this embodiment, the measuring sensor 14 is almost in contact with a surface S wherein the reference sensor 18 is provided slightly more distant to the surface S. With the temperature-measuring device 10 a surface temperature Ts should be measured. In this embodiment the surface S encloses a medium 22 inside e.g. a pipe. The medium 22 thereby may have a temperature as high as e.g. 700° C. or more, and as low as −50° C. or lower.

In order to evaluate the sensor value or a model-based measurement result of the surface temperature Ts, the temperature-measuring device 10 further comprises a value processing device 26. The value processing device 26, and all other similar devices of the present disclosure can be implemented in hardware and/or software using programmable logic controllers coupled with memory storage devices, input and output devices, and the like. Any such implementation can be configured using a single controller or more than one controller that are either physical or virtual, and are either co-located or located at various locations remotely from one another and with appropriate information communication and exchange protocols. With this temperature-measuring device 10 the medium temperature can be calculated by measuring the surface temperature Ts. The measuring sensor 14 is connected to the value processing means 10 via a first connection line 30. Likewise, the reference sensor 18 is connected to the value processing means 26 via a second connection line 34.

The connection lines 30, 34 comprises at least a portion, which is provided as a mineral-insulated sheathed cable 38, and a portion, which is provided as a flexible cable 42. The mineral-insulated sheathed cables 38 are made with an outer sheath of metal, the outer sheath enclosing at least two inner cables, which are insulated against the outer sheath with highly compressed metal oxide powder. The portion provided as a mineral-insulated sheathed cable 38 thereby is at the side of the sensors 14, 18 wherein the flexible cable 42 is connected to the value processing device 26. By using the flexible cables 42, the value processing device 26 can be provided remotely to the surface. The mineral-insulated sheathed cable 38 and the flexible cable 42 are connected at a junction 46.

In this embodiment, the mineral-insulated sheathed cables 38 of the reference sensor 18 and the measuring sensor 14 are located at least partly in a neck tube 40, which is air-filled, provided together as a single part. Further, also the flexible cables 42 of the measuring sensor 14 and the reference sensor 18 are provided together as one cable harness. The flexible cable 42 comprises a cable insulation having an emissivity of higher than 0.9. With this cable insulation, it is possible to emit a large amount of heat to the environment, so that the temperature of the flexible cable 42 can be kept in an acceptable range. The various sensors are operatively and communicatively connected with the processing device 26 and configured to provide signals thereto that are indicative of corresponding sensor measurements.

Figure 2:
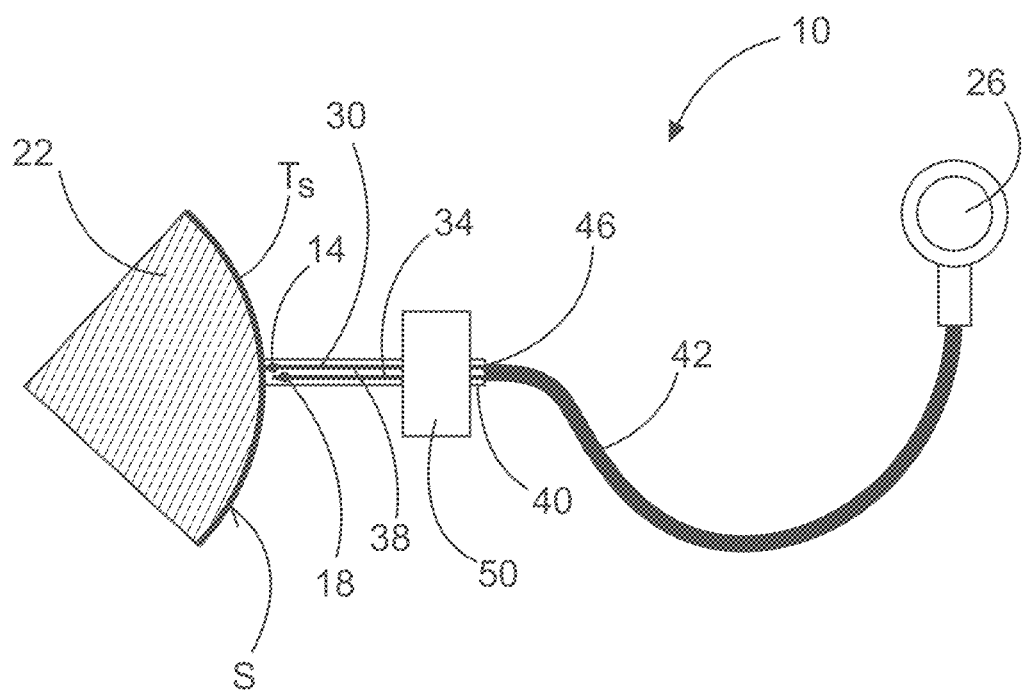
FIG. 2 is a schematic drawing of the temperature-measuring device according to a second embodiment of the present disclosure.

In FIG. 2, a schematic drawing of the temperature-measuring device 10 according to a second embodiment of the present disclosure is shown. This embodiment differs to the embodiment in FIG. 1 in that a heat sink 50 is provided. The heat sink 50 thereby can, for example, be provided as a housing or as a body with cooling fins. The housing 50 is arranged at the mineral-insulated sheathed cables 38 close to the junction 46 to the flexible cable 42. In this embodiment the housing 50 is substantially empty but has a painting with an emissivity higher than 0.9. Due to the painting and the high surface area of the housing 50, a large cooling effect is achieved. In case of cold surface S measurement with ambient temperatures higher than the surface S, the heat sink 50 collects heat from the ambient.

Figure 3:
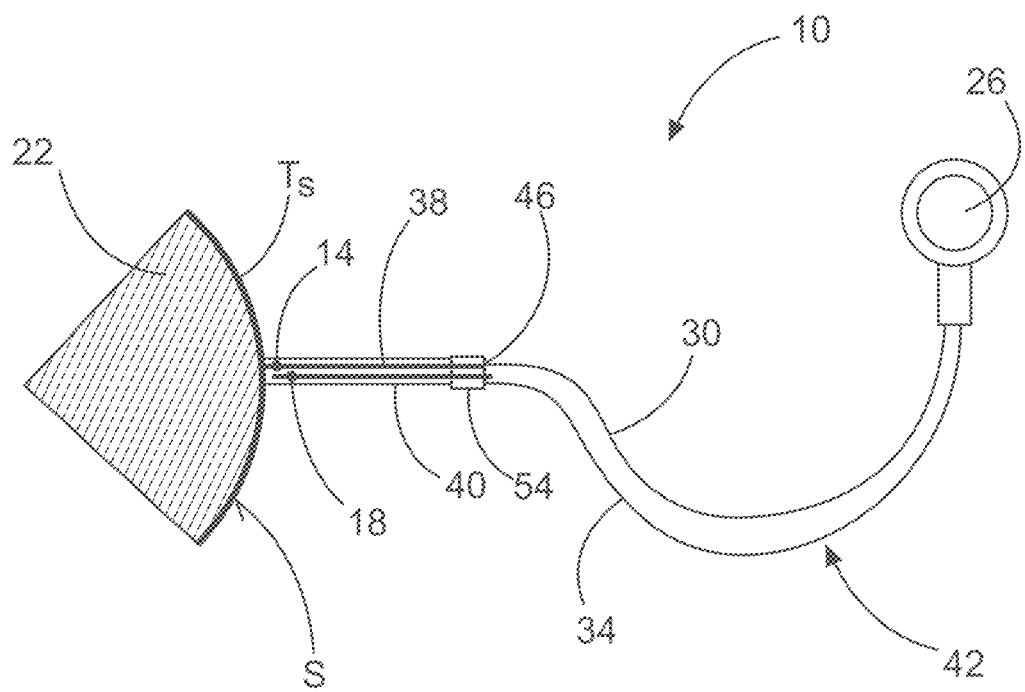
FIG. 3 is a schematic drawing of the temperature-measuring device according to a third embodiment of the present disclosure.

FIG. 3 show a schematic drawing of the temperature-measuring device 10 according to a third embodiment of the present disclosure. In this embodiment, a coating 54 is provided on the mineral-insulated sheathed cables 38, shortly before the junction 46 with the flexible cables 42. This coating 54 thereby has an emissivity, which is higher than the emissivity of the mineral-insulated sheathed cables 38. Therefore, this coating 54 provide a heat sink so that before the junction 46 to the flexible cables 42 the temperature of the mineral-insulated sheathed cable 38 is largely decreased.

In contrast to the embodiments of FIGS. 1 and 2, the flexible cables 42 of the embodiment according to FIG. 3 are not provided as one cable harness. In this embodiment the flexible cables 42 of the first and second connection 30, 34 are provided separately. By doing so the heat transfer to the environment can be increased and thus the temperature of the flexible cables 42 decreases. In a further embodiment (not shown), each of the flexible cables 42 can be split up comprising up to four lines. Thereby the surface area of the flexible cables 42 can be further increased so that the heat exchange to the environment is improved.

Figure 4:
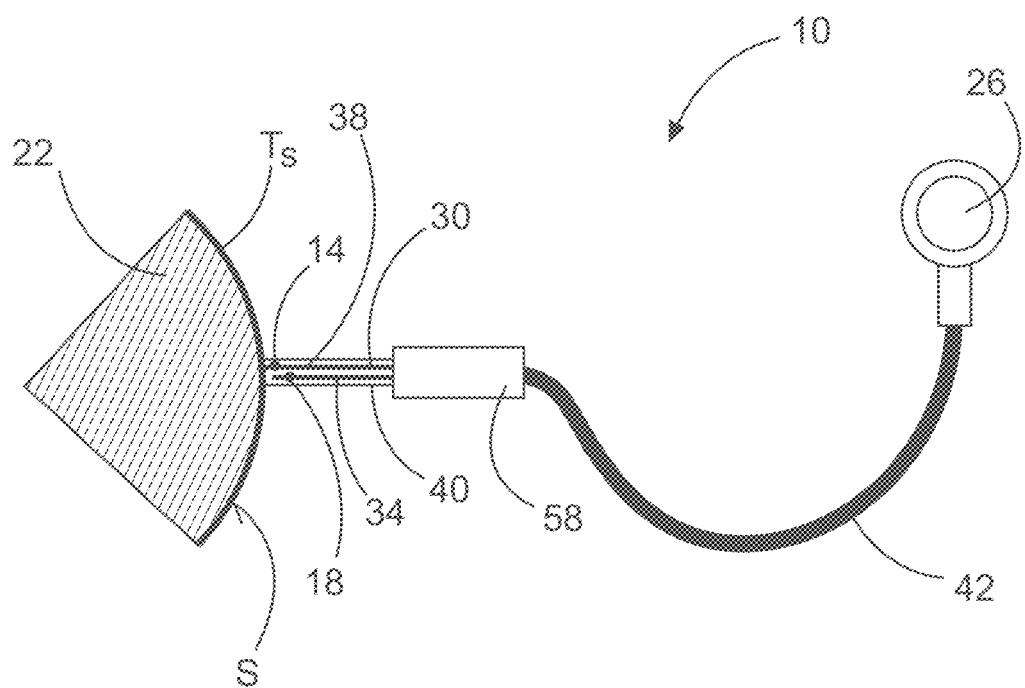
FIG. 4 is a schematic drawing of the temperature-measuring device according to a fourth embodiment of the present disclosure.

A fourth embodiment of the temperature-measuring device 10 is shown in FIG. 4. This embodiment differs to the embodiments shown in FIGS. 1 and 2 in that a thermoelectric cooler 58 is provided. The thermoelectric cooler 58 thereby may be a Peltier element. In this embodiment, the thermoelectric cooler 58 is provided at the region of the junction 46 to the flexible cables 42. The thermoelectric cooler 58 thereby actively cools the temperature to a value, which is acceptable for the flexible cables 42.

Figure 5:
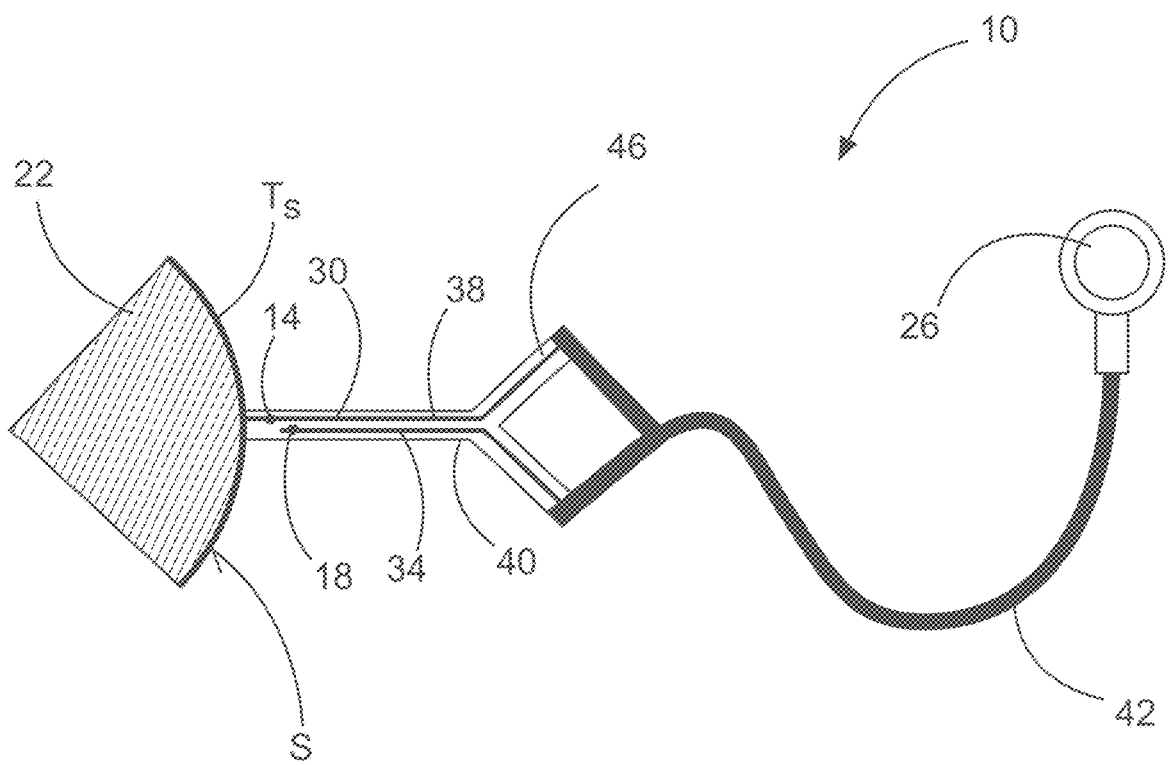
FIG. 5 is a schematic drawing of the temperature-measuring device according to a fifth embodiment of the present disclosure.

FIG. 5 shows a schematic drawing of the temperature-measuring device 10 according to a fifth embodiment of the present disclosure. In this embodiment, the neck tube 40 is split up, or widened up at its end close to the cable junction 46, e.g., in order to enlarge the thermal interaction with ambient.

At the opposite end to the measuring sensor 14 and the reference sensor 18 the mineral-insulated sheathed cable 38 of the reference sensor 18 and the measuring sensor 18 are separated from each other. In a similar way, the ends of the flexible cable 42 are separated. The ends of the mineral-insulated sheathed cables 38 and the respective flexible cables 42 are electrically connected to each other in a bifurcation arrangement. With this arrangement, the cooling effect at the junction 46 between mineral-insulated sheathed cables 38 and flexible cables 42 is improved.

Figure 6:
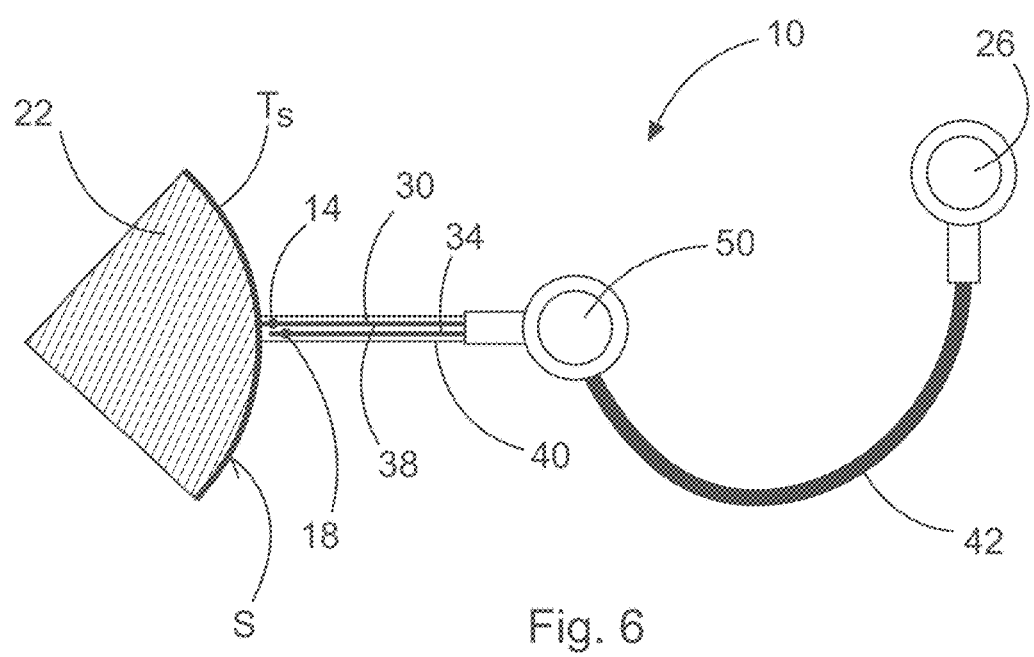
FIG. 6 is a schematic drawing of the temperature-measuring device according to a sixth embodiment of the present disclosure.

FIG. 6 shows a schematic drawing of the temperature-measuring device 10 according to a sixth embodiment of the present disclosure. This embodiment mainly corresponds to the embodiment shown in FIG. 2. However, the housing 50 in this embodiment is not arbitrary, but this housing is mainly or substantially the same housing, or a very similar housing regarding its thermal interaction with the ambient, as is used in the head-mounted device. In contrast to the head-mounted device, the housing does not comprise the electronic equipment. This equipment is accommodated in the value processing device 26. Additionally, the housing 50 also is arranged at approximately the same position as in the head-mounted device, i.e., in the region of the junction 46.

In a general aspect, the present disclosure provides a temperature-measuring device for non-invasive measurement of a medium through a housing wall or the temperature of a surface under reproducible thermal conditions at the measuring point, with which device very high or low temperatures are measurable with high measuring accuracy.

The problem is solved by a temperature-measuring device according to claim 1. Advantageous embodiments of the disclosure are specified in the dependent claims.

According to the disclosure, a temperature-measuring device is proposed for determining the temperature of a surface or a medium by means of the temperature of the surface enclosing the medium. The temperature-measuring device comprises at least one measuring sensor and at least one reference sensor as well as a value processing device, or controller, which is connected to the measuring sensor via a first connection line and which is connected to the reference sensor via a second connection line. According to the disclosure, of both connection lines at least the first connection line is partly realized as a mineral-insulated sheathed cable providing the measuring sensor, wherein both connection lines comprise a flexible cable connected to the value processing apparatus. The connection lines transfer signals from the sensors to the processing device.

In the special case if both connection lines are thermally coupled, the at least one measuring sensor and the at least one reference sensor are located essentially on the same thermal conduction path between the surface and the junction.

The measuring sensor or the reference sensor thereby is located essentially in the tip portion of the connection lines, with which the temperature should be measured. The sensors are e.g. resistance sensors, thermocouples or any other known thermal sensor elements. According to the disclosure at least the first connection line comprises a mineral-insulated sheathes cable, which is provided close the surface, and a flexible cable provided distant to the surface. As the structure of a probe comprising mineral-insulated sheathes cables is known a detailed description hereto is omitted.

The surface temperature is calculated from the measurement signals of the measuring sensor and the reference sensor using methods known per se, such as those described in DE 10 2014 019 365, which is incorporated herein by reference.

In order to withstand potentially high process temperatures of up to 700° C. the mineral-insulation material is necessary. However, this material is rigid. At a junction, the mineral isolated leads are soldered or welded to the leads of the flexible cables. In contrast to the mineral-insulated sheathed cables or rods, the flexible cables have a low rigidity so that these cables are bendable. By utilizing the flexible cables, it is possible to provide a remote, field mounted positioning of the value processing means or measurement electronics. In contrast to the state of the art, the value processing device need not be provided as a head-mounted structure on the rigid mineral-insulated sheathed cables. Thus, measuring flexibility is improved and the value processing device can be protected respectively removed from high temperature processes.

In a preferred embodiment, the second connection line also comprises a mineral-insulated sheathed cable. Thereby the reference sensor also could be provided more close to the surface. By doing so, the measuring accuracy and/or the response time of the temperature measurement is increased.

In a further preferred embodiment, each of the flexible cables comprises a cable insulation having an emissivity of higher than 0.9. The cable insulation therefore has a high thermal radiation. The thermal load on the cable insulation thereby can be decreased more quickly, so that the temperature of the cable insulation is kept in the allowable temperature range. Preferably the emissivity of the cable insulation is higher than 0.95.

Advantageously, the flexible cable of the first connection line is provided separately to the flexible cable of the second connection line. In other words, the connection lines are not provided as common cable harness. Accordingly, the flexible cables of both connection lines are in contact with the air in the environment, so that the surface area of the connection lines is increased. Each of the connection lines decreases the temperature due to thermal radiation and thermal conduction. The temperature of the flexible cables therefore can be decreased more rapidly.

In a further advantageous development, each flexible cable is split up into several separate lines comprising up to four lines. Preferably, the flexible cable are split up in the region of the heat sink structure of the joints. Each line is split up into several separate lines running parallel to each other. Thereby, the total surface of the lines can be increased. By increasing the surface of the lines, the thermal radiation and the thermal conduction will be increased as well. Thus, it is possible to keep the temperature in an acceptable range. This has the advantage that higher surface temperatures can be measured without damaging the cable insulation due to the thermal load.

In a preferred embodiment, a heat sink is provided in the region of a junction to the flexible cable of the at least one mineral-insulated sheathed cable. According to the disclosure, a heat sink is a device or a measure with which the heat transfer to the environment is further increased. This heat sink is provided in the region of the junction so that the temperature before the flexible cable is decreased. The junction is the position where the mineral-insulated sheathed cables are electrically connected to the flexible cables. This has the advantage that higher surface temperatures can be measured, without damaging the cable insulation. It is also possible to use cable insulations having a lower operation temperature. These cable insulations are usually cheaper than cable insulations having a higher allowable operation temperature. Accordingly, a respective temperature-measuring device is more economically.

A preferred embodiment specifies that the heat sink is provided as a housing. By using a housing, which is provided on the mineral-insulated material, the surface area can be significantly increased. By doing so, more heat of the mineral-insulated sheathed cables can be removed. Preferably, the housing is empty. Alternatively, the housing may contain the connection of mineral insulated rods and flexible cables mentioned above. The housing thereby is a simple device for decreasing the temperature, in particular at the connection. Therefore, the temperature can be decreased in a simple manner.

Preferably, the housing has a paint with an emissivity of higher than 0.9. Especially preferred, the paint has an emissivity of higher than 0.95. The respective paint is provided on the entire surface of the housing. As this paint has a high emissivity, the thermal radiation of the housing can be further increased. In a preferred embodiment, the housing is powder-coated.

Advantageously, the housing corresponds to the housing of a head-mounted value processing means. Preferably, the housing have the same size and the same position as the head-mounted value processing means. In other words, the housing is a dummy-value processing device, which does not comprise the electronic measuring equipment inside the housing. Such a housing has the advantage that thermal boundary conditions, which are designed for the head-mounted processing means, can be maintained. Further, a re-calibration of the device for correct model-based surface temperature measurement is not necessary. Further, parameters of the calculation software need not to be changed.

In a further embodiment of the present disclosure, an end part of the least one mineral-insulated sheathed cable comprises a region where the mineral-insulation is exchanged by a coating having a thermal emission coefficient, which is higher than the emission coefficient of the mineral-insulation. Preferably, the coating has an emissivity of higher than 0.95. By using this coating, a cooling effect can be achieved so that the temperatures at the junction are lower, than without the coating.

In an alternative embodiment, or in conjunction with the heat sink, a thermoelectric cooler is provided at the mineral-insulated sheathed cable in the region of the junction to the flexible cables. A thermoelectric cooler is an electrical device, which uses the Peltier effect to create a heat flux. Such a thermoelectric cooler can be provided as a Peltier element. By providing electric energy, the heat flux from one side to the other side can be improved. Accordingly, the cooling effect of the junction can be actively increased.

However, the thermoelectric cooler also can be operated in a passive way. In this mode, the thermoelectric cooler generates energy due to the heat at the junction. This energy preferably is provided to power and/or a sensor battery. As a resistance of the mineral-insulated sheathed cable is known and the height of the generated current corresponds to the temperature at the junction this current also can be used as an indication of the surface temperature.

In a preferred embodiment, additionally to the first connection line the second connection line is partly provided as a mineral-insulated sheathed cable, wherein the junction to the flexible cable of the first and the second connection line is provided as a bifurcation. In other words, in the region of the junction the mineral-insulated sheathed cable of the measuring sensor and the reference sensor are separated from each other. In a same manner the flexible cable of the reference sensor and the measuring sensor are separated from each other. Accordingly, in the region of the junction the flexible cable and the mineral-insulated sheathed cable are not provided as a cable harness. The cables therefore form a bifurcation arrangement. This arrangement has the advantage that in this region the surface area is increased and thereby the cooling effect further is improved.

In another preferred embodiment, air movers like piezo electric fans, synthetic jets or even small fans, phase change materials etc. can be used to stabilize the temperature of the cable-sheath connection.

In another preferred embodiment, the mineral insulated sheaths are surrounded by air or some other thermal insulating material and a metallic neck tube as it is well-known for other industrial temperature instruments. In a preferred variant of the design, the rods do not directly touch the neck tube. The neck tube may be fixed to the process vessel by a mechanical adapter structure. It may be connected to the heat sink structure, too.

In a preferred embodiment, the setup for active or passive cooling includes at least one additional temperature sensor within its body or close to the outer surface, or close to the electronics housing or close to the heat sink structure. These sensor(s) may be connected to the signal processing electronics.

LIST OF REFERENCE NUMBERS 10 temperature-measuring device
14 measuring sensor
18 reference sensor
22 medium
26 value processing means
30 first connection line
34 second connection line
38 mineral-insulated sheathed cable
40 neck tube
42 flexible cable
46 junction
50 heat sink/housing
54 coating
58 thermoelectric cooler
S surface
Ts surface temperature All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A temperature-measuring device for determining a temperature of a surface or a medium based on a temperature of the surface enclosing the medium, comprising:
   at least one measuring sensor;
   at least one reference sensor;
   a value processing device operatively connected with the at least one reference sensor and the at least one reference sensor,
   wherein the value processing device is connected to the at least one measuring sensor via a first connection line, wherein the value processing device is connected to the at least one reference sensor via a second connection line;
   wherein the first connection line is partly realized as a mineral-insulated sheathed cable providing the measuring sensor;
   wherein each of the first and second connection lines comprises a flexible cable connected to the value processing device; and
   a heat sink in a region of a junction connected to the flexible cable and the at least one mineral-insulated sheathed cable.

2. The temperature-measuring device according to claim 1, wherein the respective flexible cables of the first and second connection lines comprises a cable insulation having an emissivity of higher than 0.9.

3. The temperature-measuring device according to claim 1, wherein the flexible cable of the first connection line is provided separately from the flexible cable of the second connection line.

4. The temperature-measuring device according to claim 1, wherein each flexible cable is split up into several separate lines comprising up to four lines.

5. The temperature-measuring device according to claim 1, wherein the heat sink defines a housing.

6. The temperature-measuring device according to claim 5, wherein the housing is painted with a paint with an emissivity of higher than 0.9.

7. The temperature-measuring device according to claim 5, wherein the housing encompasses a housing of a head-mounted value processing means.

8. The temperature-measuring device according to claim 1, wherein an end part of the least one mineral-insulated sheathed cable comprises a region where the mineral-insulation is exchanged by a coating having a thermal emission coefficient that is higher than an emission coefficient of the mineral-insulation.

9. The temperature-measuring device according to claim 1, further comprising a thermoelectric cooler disposed at the mineral-insulated sheathed cable in a region of a junction to the flexible cables.

10. The temperature-measuring device according to claim 1, further comprising a thermoelectric cooler disposed at the mineral-insulated sheathed cable in a region of a junction to the flexible cables.

11. The temperature-measuring device according to claim 1, wherein the second connection line is partly provided as a mineral-insulated sheathed cable, and wherein a junction to the flexible cable of the first and the second connection line is provided as a bifurcation.

\* \* \* \* \*